(12) United States Patent
Barabash

(10) Patent No.: US 12,081,303 B2
(45) Date of Patent: Sep. 3, 2024

(54) METHOD AND APPARATUS TO SELECTIVELY UTILIZE ANTENNAS OF AN ANTENNA ARRAY

(71) Applicant: NOKIA SOLUTIONS AND NETWORKS OY, Espoo (FI)

(72) Inventor: Darrell William Barabash, Grapevine, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 152 days.

(21) Appl. No.: 17/630,020

(22) PCT Filed: Jul. 26, 2019

(86) PCT No.: PCT/US2019/043647
§ 371 (c)(1),
(2) Date: Jan. 25, 2022

(87) PCT Pub. No.: WO2021/021077
PCT Pub. Date: Feb. 4, 2021

(65) Prior Publication Data
US 2022/0255610 A1  Aug. 11, 2022

(51) Int. Cl.
*H04B 7/06* (2006.01)
*H01Q 3/24* (2006.01)

(52) U.S. Cl.
CPC ............ *H04B 7/0686* (2013.01); *H01Q 3/24* (2013.01)

(58) Field of Classification Search
CPC ...... H04B 7/0686; H04B 7/0617; H01Q 3/24; H01Q 1/02
(Continued)

(56) References Cited

U.S. PATENT DOCUMENTS

| 8,295,382 B2 * | 10/2012 | Xu | H04B 7/0691 |
| | | | 375/267 |
| 2009/0167311 A1 * | 7/2009 | Tong | H01Q 3/2605 |
| | | | 455/562.1 |

(Continued)

FOREIGN PATENT DOCUMENTS

| EP | 0315689 | 5/1989 |
| EP | 3073572 A1 | 9/2016 |

(Continued)

OTHER PUBLICATIONS

Hemadeh et al., "Millimeter-Wave Communications: Physical Channel Models, Design Considerations, Antenna Constructions, and Link-Budget", IEEE Communications Surveys & Tutorials, vol. 20, No. 2, (Dec. 14, 2017), 44 pages.

(Continued)

*Primary Examiner* — Don N Vo
(74) *Attorney, Agent, or Firm* — ALSTON & BIRD LLP

(57) ABSTRACT

A method, apparatus and computer program product are provided disable one or more antennas of an antenna array in order to achieve a predefined objective while selectively utilizing the remainder of the antennas of the antenna array. The one or more antennas to be disabled are selected in a manner to avoid appreciable impact to the fidelity of the resulting array radiation pattern. For example, the method, apparatus and computer program product may disable certain antenna elements based upon the distance of the antenna elements from a predefined location relative to the antenna array, such as the distance from the center of the antenna array, and may selectively utilize the remainder of the antenna elements such that an active portion of the antenna array approximates a circular array which results in an array radiation pattern for which the fidelity is maintained.

20 Claims, 8 Drawing Sheets

(58) Field of Classification Search
USPC .......................................................... 455/101
See application file for complete search history.

(56) References Cited

U.S. PATENT DOCUMENTS

| | | | |
|---|---|---|---|
| 2011/0045768 A1 | 2/2011 | Keerthi | |
| 2013/0195222 A1 | 8/2013 | Zatman et al. | |
| 2016/0233580 A1 | 8/2016 | Aparin et al. | |
| 2019/0044594 A1 | 2/2019 | Kim et al. | |
| 2019/0190148 A1* | 6/2019 | Yao | H03L 7/18 |
| 2019/0267709 A1* | 8/2019 | Mow | H01Q 21/24 |
| 2020/0411960 A1* | 12/2020 | Ng | H01Q 21/0025 |

FOREIGN PATENT DOCUMENTS

| | | |
|---|---|---|
| KR | 101 958 595 B1 | 3/2019 |
| WO | WO 88/10523 | 12/1988 |
| WO | WO 2015/006293 A1 | 1/2015 |
| WO | WO 2016/126368 A1 | 8/2016 |

OTHER PUBLICATIONS

International Search Report and Written Opinion for Patent Cooperation Treaty Application No. PCT/US2019/043647 dated Mar. 18, 2020, 21 pages.
Office Action for European Application No. 19749558.3 dated Apr. 12, 2024, 5 pages.

* cited by examiner

METHOD AND APPARATUS TO SELECTIVELY UTILIZE ANTENNAS OF AN ANTENNA ARRAY

CROSS-REFERENCE TO RELATED APPLICATIONS

This application is a national phase entry of International Application No. PCT/US2019/043647, filed Jul. 26, 2019, the entire contents of which are incorporated herein by reference.

TECHNOLOGICAL FIELD

An example embodiment relates generally to a method, apparatus and computer program product for selectively utilizing a plurality of antennas of an antenna array such that one or more of the antennas are selected to be disabled in order to both achieve a predefined objective, such as reducing the power consumed, reducing the gain and/or widening the antenna radiation pattern, and reduce the heat generated by the antenna array while substantially maintaining the integrity of the antenna radiation pattern.

BACKGROUND

In order to address the increasing bandwidth demands by customers and applications, cellular networks are becoming smaller and more numerous. As a result, network elements, such as radios, that include antenna arrays for transmitting and/or receiving signals are being located closer to individual users and the number of such network elements that are deployed in a given network is increasing. The increased number of network elements having antenna arrays for transmitting and/or receiving signals leads to a corresponding increase in the overall energy required by such network elements. As a result of an ongoing effort to reduce the size of electronic devices including network elements that include an antenna array in combination with the increased energy demand of such network elements, the power density of the network elements is increasing. However, the power density that may be supported by a network device is limited by internal temperatures and the capacity of the mechanical enclosure of the network element to dissipate the heat generated by the energy consumption to the environment.

Typical cmWave radios, that is, radios operating with a carrier frequency in the centimeter (cm) range, utilize a small number of power amplifiers, such as one power amplifier per port, with the power amplifiers being relatively high efficiency, high power devices. The power amplifiers utilized by cmWave radios oftentimes have efficiencies of 40% or more. Thus, in order to reduce the energy requirements for a cmWave radio and to correspondingly reduce the power density that must be supported by a cmWave radio, the radio frequency (RF) drive level provided to the power amplifiers and, as a result, the output level from the power amplifier may be reduced, thereby appreciably reducing the resulting thermal load.

However, current generation mmWave radios, that is, radios operating with a carrier frequency in the millimeter (mm) range, e.g., radios operating in a band of radio spectrum greater than about 20 GigaHertz (GHz) that can be used, for example, for high-speed broadband access, do not generally operate with the same high power and high efficiency as a cmWave radio. For example, in contrast to efficiencies of 40% or more for the cmWave radios, mmWave radios may have overall power amplifier efficiencies of just a few percent.

Each transmission path of a mmWave radio, including a respective power amplifier, has a relatively low efficiency in comparison to a corresponding transmission path of a cmWave radio since the power amplifiers of a mmWave radio are operating in a more linear regime than corresponding power amplifiers of a cmWave radio. This is due to the practical difficulties of employing pre-distortion and/or efficiency enhancement techniques such as Doherty structures to the relatively large mmWave arrays. By having to operate in a more linear regime, reductions in the RF output power in a transmission path of a mmWave radio have only a small impact on the overall power consumption and thermal dissipation in comparison to the much larger impact on power consumption and thermal dissipation provided by corresponding reductions in the RF output power of a cmWave radio.

Additionally, mmWave radios typically utilize many more lower power transmission paths connected to individual antennas in the form of an array as compared to cmWave radios. In one configuration, each antenna in the antenna array of a mmWave radio operates at a defined phase and power, with the resulting signals from the antennas of the antenna array being combined in the far field of the target region in space. The number of individual transmission paths in such mmWave radios could be 32, 64, 256, 1024 or more such that the relative inefficiencies in conjunction with power consumption and heat dissipation rapidly scale to large amounts.

BRIEF SUMMARY

A method, apparatus and computer program product are provided in accordance with an example embodiment in order to selectively utilize a plurality of antenna elements of an antenna array. By selectively utilizing a plurality of antenna elements of an antenna array, one or more of the antenna elements may be disabled in order to achieve a predefined objective, such as reducing the power consumed by the antenna array, reducing the gain of the antenna array and/or widening the antenna radiation pattern. However, the method, apparatus and computer program product of an example embodiment identify the antenna element(s) of the antenna array to be disabled in a manner that achieves the predefined objective while continuing to allow the antenna array to effectively operate, such as by disabling one or more antenna elements of the antenna array which are selected in a manner to avoid appreciable impact to the fidelity of the resulting array pattern. For example, the method, apparatus and computer program product of an example embodiment are configured to selectively utilize a plurality of antenna elements of an antenna array such that an active portion of the antenna array approximates a circular array, thereby avoiding appreciable impact to the fidelity of the resulting array pattern.

In an example embodiment, an apparatus is provided that comprises processing circuitry and memory including computer program code with the memory and the computer program code configured to, with the processing circuitry, cause the apparatus to determine a number of antenna elements of an antenna array to disable to achieve a predefined objective. The memory and the computer program code are also configured to, with the processing circuitry, cause the apparatus to selectively utilize a plurality of antenna elements of the antenna array. The apparatus being caused to selectively utilize the plurality of antenna elements comprises identifying the antenna elements of the antenna array to disable based upon the number of antenna elements determined to be disabled and a distance of the antenna elements from a predefined location in relation to the antenna array and disabling the antenna elements of the antenna array that have been identified such that the antenna elements that are disabled are not utilized and do not comprise an active portion of the antenna array.

The predefined location of an example embodiment comprises a center of the antenna array. In this example embodiment, the apparatus being caused to disable the number of antenna elements comprises disabling the number of antenna elements that are furthest from the center of the antenna array. In an example embodiment, the predefined objective may be at least one of a reduction in power consumed by the antenna array, a reduction in gain of the antenna array or a widening of an antenna radiation pattern provided by the antenna array. In an example embodiment, the apparatus being caused to identify the number of antenna elements of the antenna array based upon the distance of the number of antenna elements from the predefined location in relation to the antenna array comprises referencing a list of antenna elements of the antenna array that also provides information regarding at least the distance of each of the antenna elements of the antenna array from the predefined location in relation to the antenna array.

The apparatus of an example embodiment is caused to selectively utilize a plurality of antenna elements of an antenna array by selectively feeding the plurality of antenna elements in order to transmit signals via the active portion of the antenna array. In this embodiment, the apparatus being caused to disable one or more antenna elements comprises deactivating electronic circuitry associated with the one or more antenna elements, such as by deactivating one or more power amplifiers associated with the one or more antenna elements. In an alternative embodiment, the apparatus being caused to selectively utilize a plurality of antenna elements of an antenna array comprises selectively processing signals received by the plurality of antenna elements such that the signals received via the active portion of the antenna array are processed. In this embodiment, the apparatus being caused to disable one or more antenna elements comprises deactivating electronic circuitry associated with the one or more antenna elements, such as by deactivating one or more low noise amplifiers associated with the one or more antenna elements.

In another example embodiment, a method is provided that comprises determining a number of antenna elements of an antenna array to disable to achieve a predefined objective. The method also comprises selectively utilizing a plurality of antenna elements of the antenna array. In this regard, selectively utilizing the plurality of antenna elements comprises identifying the antenna elements of the antenna array to disable based upon the number of antenna elements determined to be disabled and a distance of the antenna elements from a predefined location in relation to the antenna array and disabling the antenna elements of the antenna array that have been identified such that the antenna elements that are disabled are not utilized and do not comprise an active portion of the antenna array.

The predefined location of an example embodiment comprises a center of the antenna array. In this example embodiment, disabling the number of antenna elements comprises disabling the number of antenna elements that are furthest from the center of the antenna array. In an example embodiment, the predefined objective may be at least one of a reduction in power consumed by the antenna array, a reduction in gain of the antenna array or a widening of an antenna radiation pattern provided by the antenna array. In an example embodiment, identifying the number of antenna elements of the antenna array based upon the distance of the number of antenna elements from the predefined location in relation to the antenna array comprises referencing a list of antenna elements of the antenna array that also provides information regarding at least the distance of each of the antenna elements of the antenna array from the predefined location in relation to the antenna array.

The method of an example embodiment selectively utilizes a plurality of antenna elements of an antenna array by selectively feeding the plurality of antenna elements in order to transmit signals via the active portion of the antenna array. In this embodiment, disabling one or more antenna elements comprises deactivating electronic circuitry associated with the one or more antenna elements, such as by deactivating one or more power amplifiers associated with the one or more antenna elements. In an alternative embodiment, selectively utilizing a plurality of antenna elements of an antenna array comprises selectively processing signals received by the plurality of antenna elements such that the signals received via the active portion of the antenna array are processed. In this embodiment, disabling one or more antenna elements comprises deactivating electronic circuitry associated with the one or more antenna elements, such as by deactivating one or more low noise amplifiers associated with the one or more antenna elements.

In a further example embodiment, a computer program product is provided that is embodied on a non-transitory computer readable medium and that comprises computer program code configured to, when executed by processing circuitry, cause an apparatus or a system to determine a number of antenna elements of an antenna array to disable to achieve a predefined objective. The computer program product also comprises computer program code configured to, when executed by the processing circuitry, cause the apparatus or the system to selectively utilize a plurality of antenna elements of the antenna array. The computer program code configured to selectively utilize the plurality of antenna elements comprises computer program code configured to identify the antenna elements of the antenna array to disable based upon the number of antenna elements determined to be disabled and a distance of the antenna elements from a predefined location in relation to the antenna array and computer program code configured to disable the antenna elements of the antenna array that have been identified such that the antenna elements that are disabled are not utilized and do not comprise an active portion of the antenna array.

The predefined location of an example embodiment comprises a center of the antenna array. In this example embodiment, the computer program code configured to disable the number of antenna elements comprises computer program code configured disable the number of antenna elements that are furthest from the center of the antenna array. In an example embodiment, the predefined objective may be at least one of a reduction in power consumed by the antenna array, a reduction in gain of the antenna array or a widening of an antenna radiation pattern provided by the antenna array. In an example embodiment, the computer program code configured to identify the number of antenna elements of the antenna array based upon the distance of the number of antenna elements from the predefined location in relation to the antenna array comprises computer program code configured to reference a list of antenna elements of the antenna array that also provides information regarding at least the distance of each of the antenna elements of the antenna array from the predefined location in relation to the antenna array.

The computer program code of an example embodiment that is configured to selectively utilize a plurality of antenna elements of an antenna array comprises computer program code configured to selectively feed the plurality of antenna elements in order to transmit signals via the active portion of the antenna array. In this embodiment, the computer program code configured to disable one or more antenna elements comprises computer program code configured to deactivate electronic circuitry associated with the one or more antenna elements, such as computer program code configured to deactivate one or more power amplifiers associated with the one or more antenna elements. In an alternative embodiment, the computer program code configured to selectively utilize a plurality of antenna elements of an antenna array comprises computer program code configured to selectively process signals received by the plurality of antenna elements such that the signals received via the active portion of the antenna array are processed. In this embodiment, the computer program code configured to disable one or more antenna elements comprises computer program code configured to deactivate electronic circuitry associated with the one or more antenna elements, such as computer program code configured to deactivate one or more low noise amplifiers associated with the one or more antenna elements.

In yet another example embodiment, an apparatus is provided that comprises means for determining a number of antenna elements of an antenna array to disable to achieve a predefined objective. The apparatus also comprises means for selectively utilizing a plurality of antenna elements of the antenna array. In this regard, the means for selectively utilizing the plurality of antenna elements comprises means for identifying the antenna elements of the antenna array to disable based upon the number of antenna elements determined to be disabled and a distance of the antenna elements from a predefined location in relation to the antenna array and means for disabling the antenna elements of the antenna array that have been identified such that the antenna elements that are disabled are not utilized and do not comprise an active portion of the antenna array.

The predefined location of an example embodiment comprises a center of the antenna array. In this example embodiment, the means for disabling the number of antenna elements comprises means for disabling the number of antenna elements that are furthest from the center of the antenna array. In an example embodiment, the predefined objective may be at least one of a reduction in power consumed by the antenna array, a reduction in gain of the antenna array or a widening of an antenna radiation pattern provided by the antenna array. In an example embodiment, the means for identifying the number of antenna elements of the antenna array based upon the distance of the number of antenna elements from the predefined location in relation to the antenna array comprises means for referencing a list of antenna elements of the antenna array that also provides information regarding at least the distance of each of the antenna elements of the antenna array from the predefined location in relation to the antenna array.

The means for selectively utilizing a plurality of antenna elements of an antenna array in accordance with an example embodiment comprises means for selectively feeding the plurality of antenna elements in order to transmit signals via the active portion of the antenna array. In this embodiment, the means for disabling one or more antenna elements comprises means for deactivating electronic circuitry associated with the one or more antenna elements, such as means for deactivating one or more power amplifiers associated with the one or more antenna elements. In an alternative embodiment, the means for selectively utilizing a plurality of antenna elements of an antenna array comprises means for selectively processing signals received by the plurality of antenna elements such that the signals received via the active portion of the antenna array are processed. In this embodiment, the means for disabling one or more antenna elements comprises means for deactivating electronic circuitry associated with the one or more antenna elements, such as means for deactivating one or more low noise amplifiers associated with the one or more antenna elements.

In an example embodiment, an apparatus is provided that comprises processing circuitry and memory including computer program code with the memory and the computer program code configured to, with the processing circuitry, cause the apparatus to selectively utilize a plurality of antenna elements of an antenna array such that an active portion of the antenna array approximates a circular array. The apparatus being caused to selectively utilize the plurality of antenna elements comprises identifying one or more antenna elements of the antenna array based upon a distance of the one or more antenna elements from a predefined location in relation to the antenna array and disabling the one or more antenna elements of the antenna array that have been identified such that the one or more antenna elements that are disabled are not utilized and do not comprise the active portion of the antenna array.

The predefined location of an example embodiment comprises a center of the antenna array. In this example embodiment, the apparatus being caused to disable the one or more antenna elements comprises disabling the one or more antenna elements that are furthest from the center of the antenna array. In an example embodiment, the apparatus being caused to disable the one or more antenna elements comprises determining a number of antenna elements to disable to achieve a predefined objective. The predefined objective may be at least one of a reduction in power consumed by the antenna array, a reduction in gain of the antenna array or a widening of an antenna radiation pattern provided by the antenna array. The apparatus of an example embodiment is caused to identify one or more antenna elements of the antenna array based upon the distance of the one or more antenna elements from the predefined location in relation to the antenna array by referencing a list of antenna elements of the antenna array that also provides information regarding at least the distance of each of the antenna elements of the antenna array from the predefined location in relation to the antenna array.

The apparatus being caused to selectively utilize a plurality of antenna elements of an antenna array in accordance with an example embodiment comprises selectively feeding the plurality of antenna elements in order to transmit signals via the active portion of the antenna array. In this example embodiment, the apparatus being caused to disable one or more antenna elements comprises deactivating electronic circuitry associated with the one or more antenna elements, such as by deactivating one or more power amplifiers associated with the one or more antenna elements. In this example embodiment, the apparatus being caused to selectively feed the plurality of antenna elements of the antenna array comprises selectively feeding the plurality of antenna elements such that the plurality of antenna elements that are fed operate at a maximum power level. In an alternative embodiment, the apparatus being caused to selectively utilize a plurality of antenna elements of an antenna array comprises selectively processing signals received by the plurality of antenna elements such that the signals received via the active portion of the antenna array are processed. In this example embodiment, the apparatus being caused to disable one or more antenna elements comprises deactivating electronic circuitry associated with the one or more antenna elements, such as by deactivating one or more low noise amplifiers associated with the one or more antenna elements.

In another example embodiment, a method is provided that comprises selectively utilizing a plurality of antenna elements of an antenna array such that an active portion of the antenna array approximates a circular array. Selectively utilizing the plurality of antenna elements comprises identifying one or more antenna elements of the antenna array based upon a distance of the one or more antenna elements from a predefined location in relation to the antenna array and disabling the one or more antenna elements of the antenna array that have been identified such that the one or more antenna elements that are disabled are not utilized and do not comprise the active portion of the antenna array.

The predefined location of an example embodiment comprises a center of the antenna array. In this example embodiment, disabling the one or more antenna elements comprises disabling the one or more antenna elements that are furthest from the center of the antenna array. In an example embodiment, disabling the one or more antenna elements comprises determining a number of antenna elements to disable to achieve a predefined objective. The predefined objective may be at least one of a reduction in power consumed by the antenna array, a reduction in gain of the antenna array or a widening of an antenna radiation pattern provided by the antenna array. Identifying one or more antenna elements of the antenna array in accordance with an example embodiment based upon the distance of the one or more antenna elements from the predefined location in relation to the antenna array comprises referencing a list of antenna elements of the antenna array that also provides information regarding at least the distance of each of the antenna elements of the antenna array from the predefined location in relation to the antenna array.

Selectively utilizing a plurality of antenna elements of an antenna array in accordance with an example embodiment comprises selectively feeding the plurality of antenna elements in order to transmit signals via the active portion of the antenna array. In this example embodiment, disabling one or more antenna elements comprises deactivating electronic circuitry associated with the one or more antenna elements, such as by deactivating one or more power amplifiers associated with the one or more antenna elements. In this example embodiment, selectively feeding the plurality of antenna elements of the antenna array comprises selectively feeding the plurality of antenna elements such that the plurality of antenna elements that are fed operate at a maximum power level. In an alternative embodiment, selectively utilizing a plurality of antenna elements of an antenna array comprises selectively processing signals received by the plurality of antenna elements such that the signals received via the active portion of the antenna array are processed. In this example embodiment, disabling one or more antenna elements comprises deactivating electronic circuitry associated with the one or more antenna elements, such as by deactivating one or more low noise amplifiers associated with the one or more antenna elements.

In a further example embodiment, a computer program product is provided that is embodied on a non-transitory computer readable medium and that comprises computer program code configured to, when executed by processing circuitry, cause an apparatus or a system to selectively utilize a plurality of antenna elements of an antenna array such that an active portion of the antenna array approximates a circular array. The computer program code configured to selectively utilize the plurality of antenna elements comprises computer program code configured to identify one or more antenna elements of the antenna array based upon a distance of the one or more antenna elements from a predefined location in relation to the antenna array and computer program code configured to disable the one or more antenna elements of the antenna array that have been identified such that the one or more antenna elements that are disabled are not utilized and do not comprise the active portion of the antenna array.

The predefined location of an example embodiment comprises a center of the antenna array. In this example embodiment, the computer program code configured to disable the one or more antenna elements comprises computer program code configured to disable the one or more antenna elements that are furthest from the center of the antenna array. In an example embodiment, the computer program code configured to disable the one or more antenna elements comprises computer program code configured to determine a number of antenna elements to disable to achieve a predefined objective. The predefined objective may be at least one of a reduction in power consumed by the antenna array, a reduction in gain of the antenna array or a widening of an antenna radiation pattern provided by the antenna array. The computer program code configured to identify one or more antenna elements of the antenna array in accordance with an example embodiment based upon the distance of the one or more antenna elements from the predefined location in relation to the antenna array comprises computer program code configured to reference a list of antenna elements of the antenna array that also provides information regarding at least the distance of each of the antenna elements of the antenna array from the predefined location in relation to the antenna array.

The computer program code configured to selectively utilize a plurality of antenna elements of an antenna array in accordance with an example embodiment comprises computer program code configured to selectively feed the plurality of antenna elements in order to transmit signals via the active portion of the antenna array. In this example embodiment, the computer program code configured to disable one or more antenna elements comprises computer program code configured to deactivate electronic circuitry associated with the one or more antenna elements, such as computer program code configured to deactivate one or more power amplifiers associated with the one or more antenna elements. In this example embodiment, the computer program code configured to selectively feed the plurality of antenna elements of the antenna array comprises computer program code configured to selectively feed the plurality of antenna elements such that the plurality of antenna elements that are fed operate at a maximum power level. In an alternative embodiment, the computer program code configured to selectively utilize a plurality of antenna elements of an antenna array comprises computer program code configured to selectively process signals received by the plurality of antenna elements such that the signals received via the active portion of the antenna array are processed. In this example embodiment, the computer program code configured to disable one or more antenna elements comprises computer program code configured to deactivate electronic circuitry associated with the one or more antenna elements, such as computer program code configured to deactivate one or more low noise amplifiers associated with the one or more antenna elements.

In yet another example embodiment, an apparatus is provided that comprises means for selectively utilizing a plurality of antenna elements of an antenna array such that an active portion of the antenna array approximates a circular array. The means for selectively utilizing the plurality of antenna elements comprises means for identifying one or more antenna elements of the antenna array based upon a distance of the one or more antenna elements from a predefined location in relation to the antenna array and means for disabling the one or more antenna elements of the antenna array that have been identified such that the one or more antenna elements that are disabled are not utilized and do not comprise the active portion of the antenna array.

The predefined location of an example embodiment comprises a center of the antenna array. In this example embodiment, the means for disabling the one or more antenna elements comprises means for disabling the one or more antenna elements that are furthest from the center of the antenna array. In an example embodiment, the means for disabling the one or more antenna elements comprises means for determining a number of antenna elements to disable to achieve a predefined objective. The predefined objective may be at least one of a reduction in power consumed by the antenna array, a reduction in gain of the antenna array or a widening of an antenna radiation pattern provided by the antenna array. The means for identifying one or more antenna elements of the antenna array in accordance with an example embodiment based upon the distance of the one or more antenna elements from the predefined location in relation to the antenna array comprises means for referencing a list of antenna elements of the antenna array that also provides information regarding at least the distance of each of the antenna elements of the antenna array from the predefined location in relation to the antenna array.

The means for selectively utilizing a plurality of antenna elements of an antenna array in accordance with an example embodiment comprises means for selectively feeding the plurality of antenna elements in order to transmit signals via the active portion of the antenna array. In this example embodiment, the means for disabling one or more antenna elements comprises means for deactivating electronic circuitry associated with the one or more antenna elements, such as means for deactivating one or more power amplifiers associated with the one or more antenna elements. In this example embodiment, the means for selectively feeding the plurality of antenna elements of the antenna array comprises means for selectively feeding the plurality of antenna elements such that the plurality of antenna elements that are fed operate at a maximum power level. In an alternative embodiment, the means for selectively utilizing a plurality of antenna elements of an antenna array comprises means for selectively processing signals received by the plurality of antenna elements such that the signals received via the active portion of the antenna array are processed. In this example embodiment, the means for disabling one or more antenna elements comprises means for deactivating electronic circuitry associated with the one or more antenna elements, such as means for deactivating one or more low noise amplifiers associated with the one or more antenna elements.

BRIEF DESCRIPTION OF THE DRAWINGS

Figure 1:
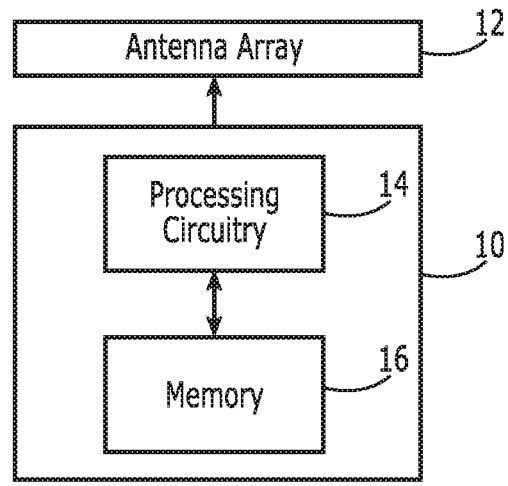
Figure 2:
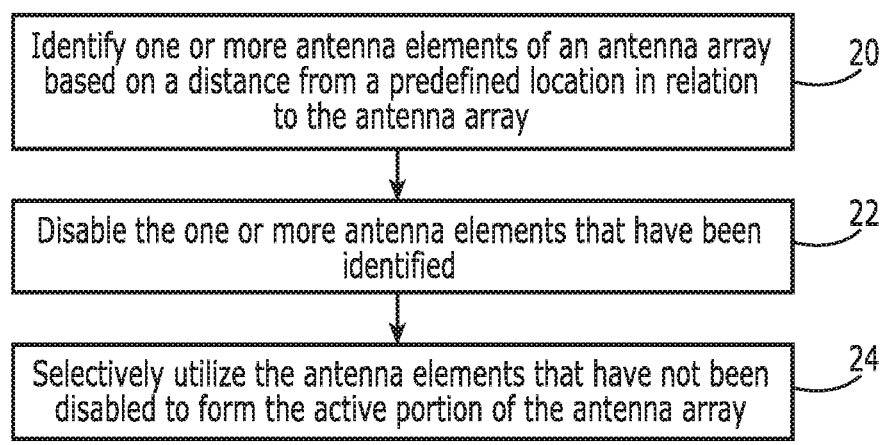
Figure 3:
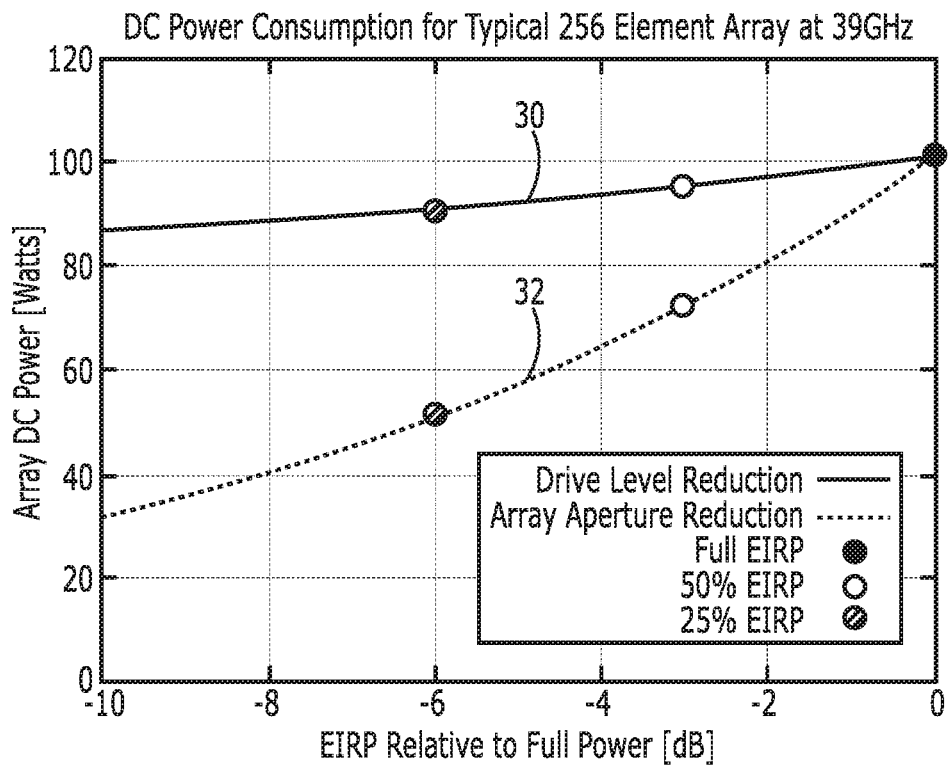
Figure 4:
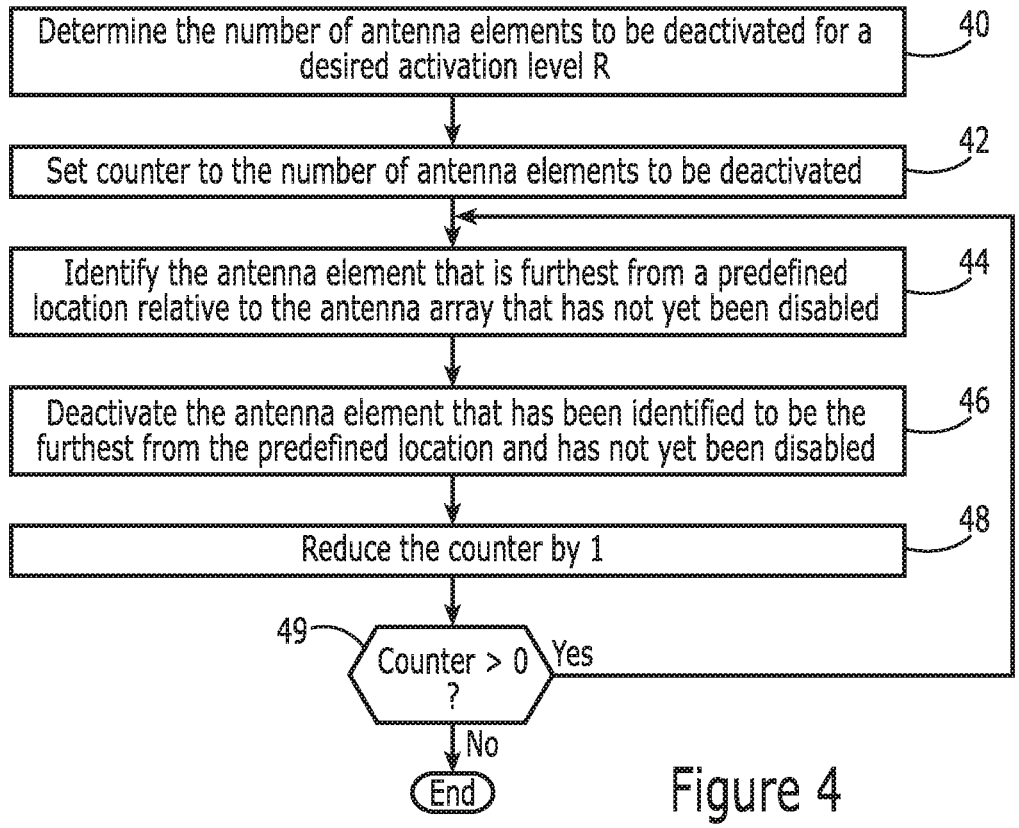
Figure 5:
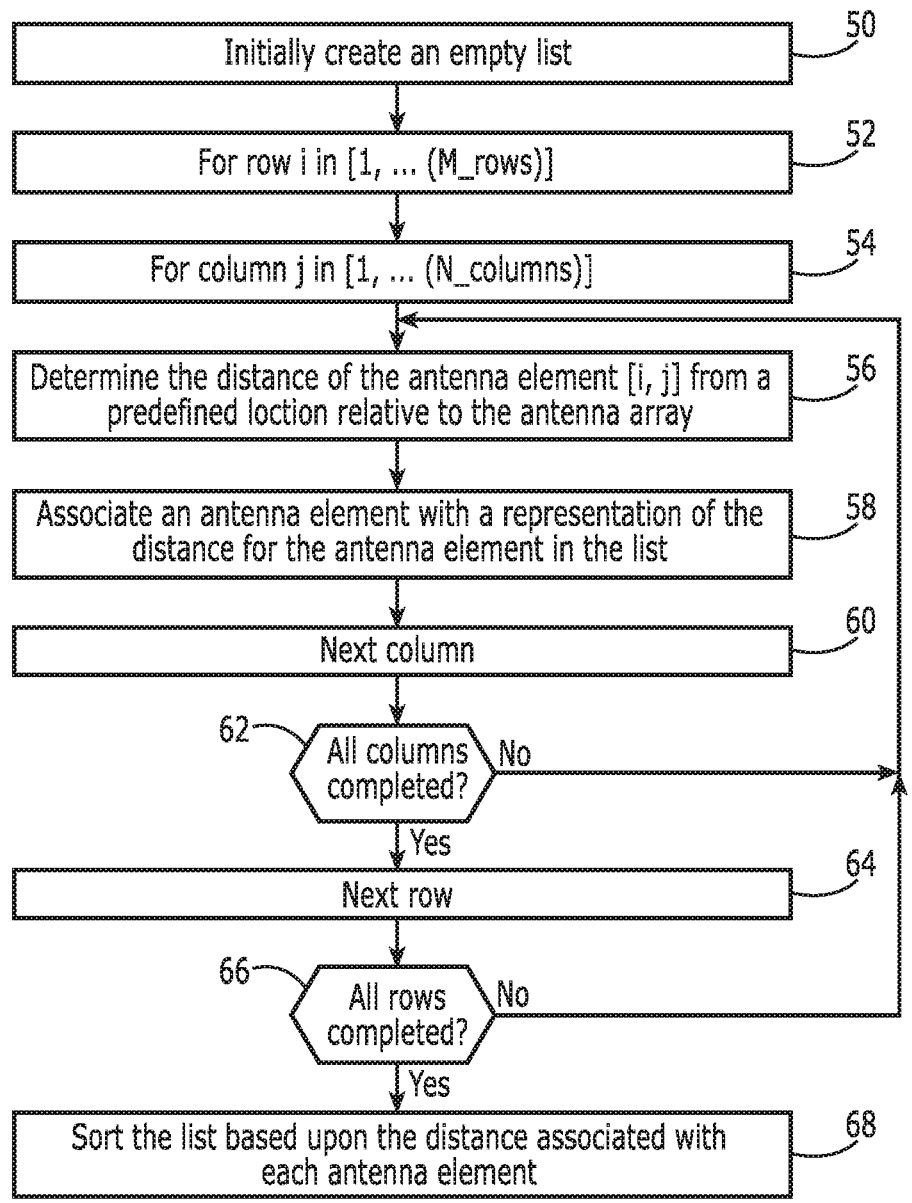
Figure 6:
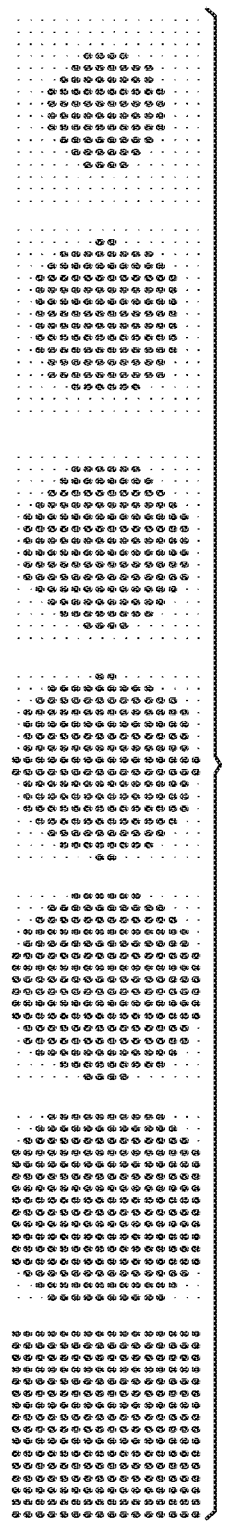
Figure 7:
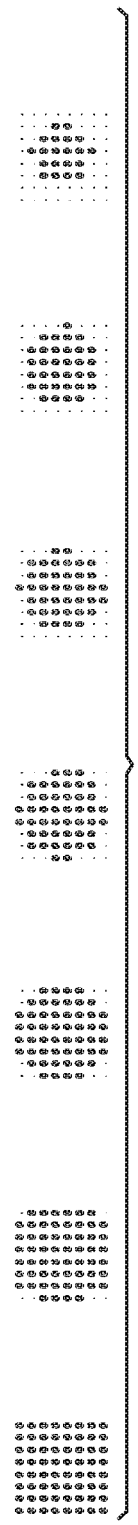
Figure 8:
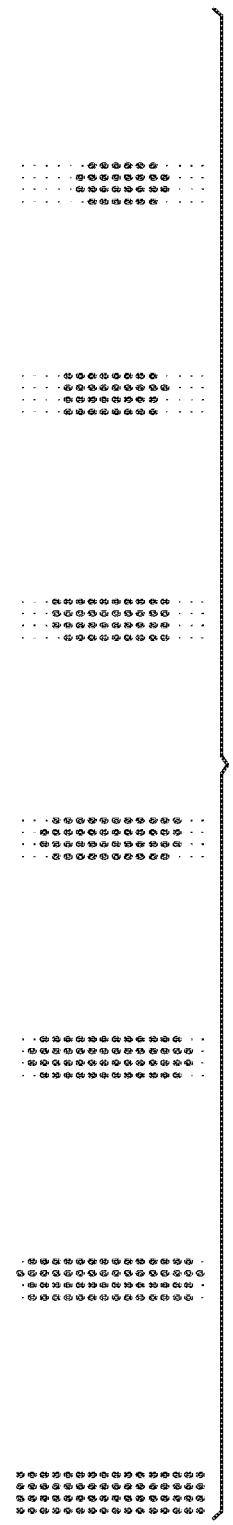
Figure 9A:
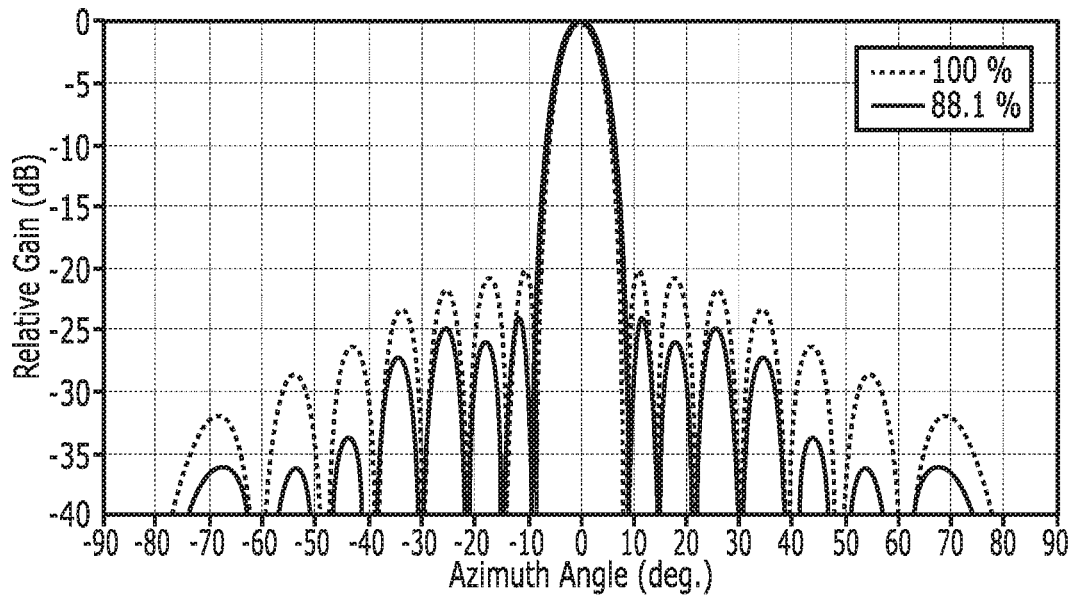
Figure 9B:
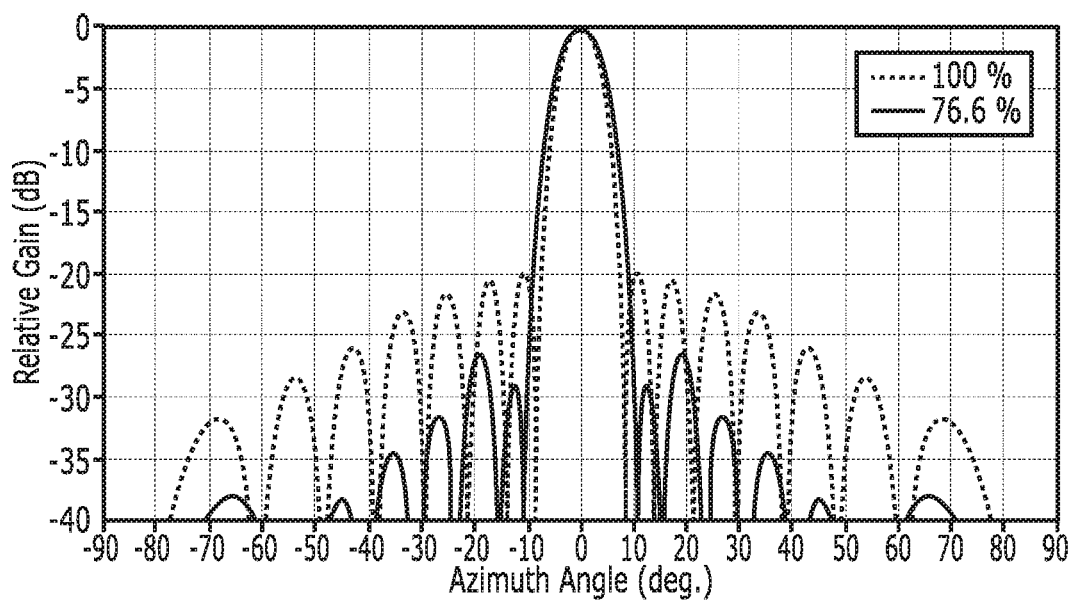
Figure 9C:
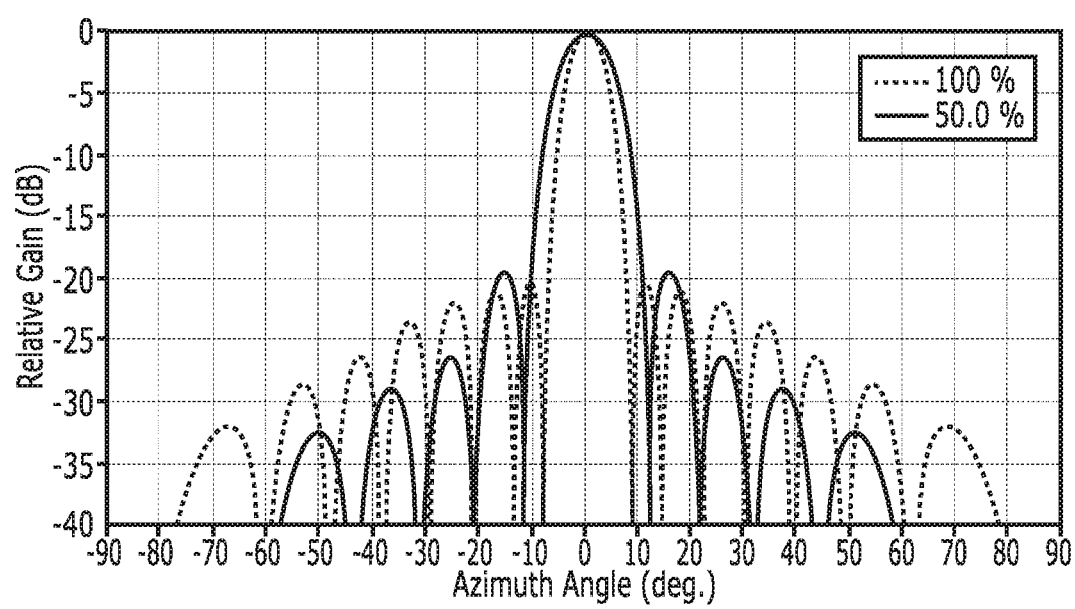
Figure 10A:
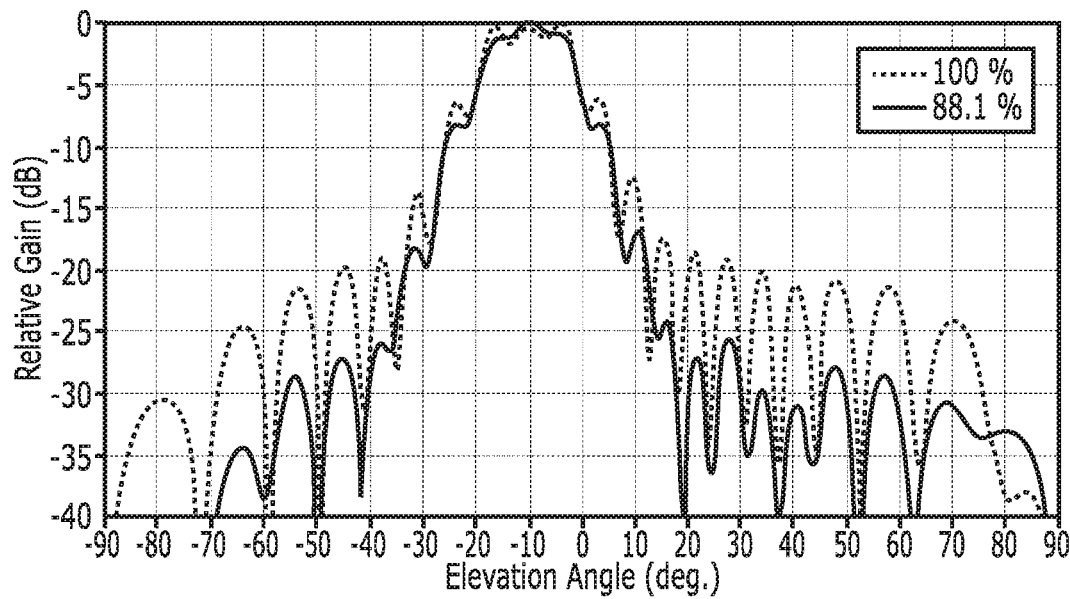
Figure 10B:
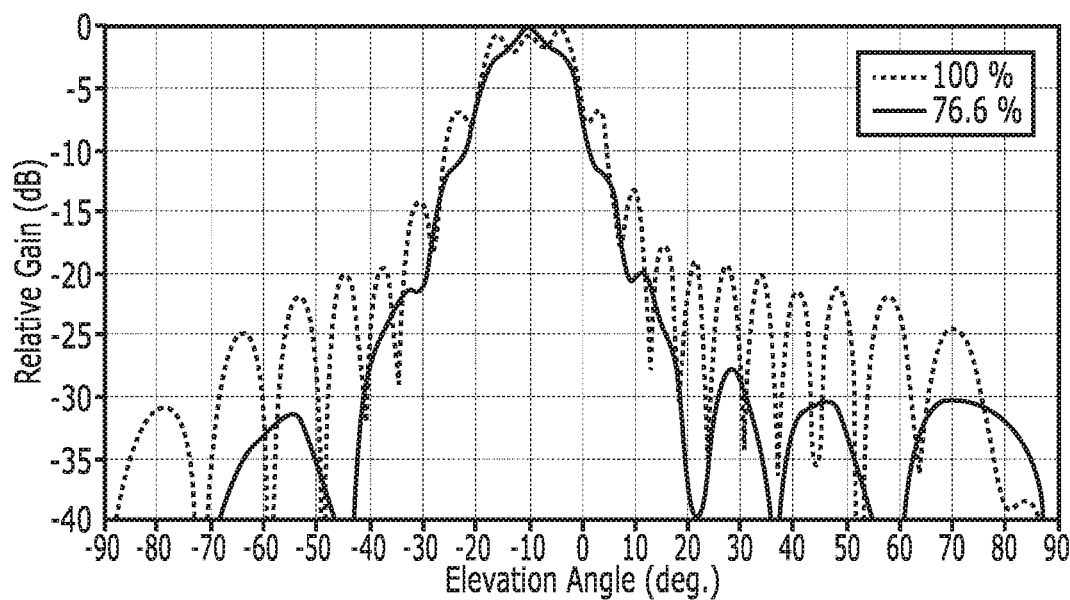
Figure 10C:
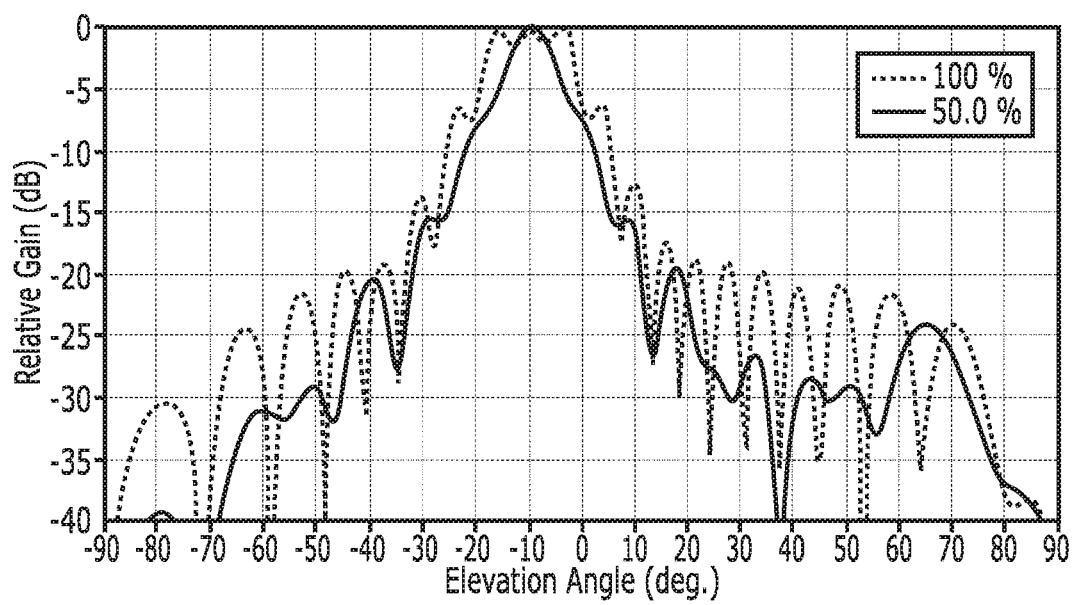

Having thus described some embodiments of the invention in general terms, reference will now be made to the accompanying drawings, which are not necessarily drawn to scale, and wherein:

FIG. 1 is a block diagram of an antenna array and an associated apparatus configured in accordance with an example embodiment of the present disclosure;

FIG. 2 is a flowchart illustrating operations performed, such as by the apparatus of FIG. 1, in accordance with an example embodiment of the present disclosure;

FIG. 3 is a graphical representation of the power consumption of an antenna array for which the array aperture is reduced in accordance with an example embodiment of the present disclosure;

FIG. 4 is a flowchart illustrating operations performed, such as by the apparatus of FIG. 1, in which the one or more antenna elements of the antenna array that are to be disabled are identified based upon reference to a list of antenna elements of the antenna array in accordance with an example embodiment of the present disclosure;

FIG. 5 is a flowchart illustrating operations performed, such as by the apparatus of FIG. 1, in order to construct a list of antenna elements of the antenna array in accordance with an example embodiment of the present disclosure;

FIG. 6 depicts the reduction in the active portion of a 16×16 antenna array in accordance with an example embodiment of the present disclosure;

FIG. 7 depicts the reduction in the active portion of an 8×8 antenna array in accordance with an example embodiment of the present disclosure;

FIG. 8 depicts the reduction in the active portion of a 4×16 antenna array in accordance with an example embodiment of the present disclosure;

FIGS. 9a-9c are graphical representations of the azimuth radiation patterns of an antenna array subjected to amplitude tapering and different activation levels in accordance with an example embodiment of the present disclosure; and FIG. 10a-10c are graphical representation of the elevation radiation patterns of an antenna array subjected to phase tapering and different activation levels in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a portable electronic device, such as a mobile phone, or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment in order to selectively utilize a plurality of antenna elements of an antenna array in such a manner as to achieve a predefined objective, such as to reduce the power consumption and corresponding thermal dissipation requirements, while substantially maintaining the integrity of the antenna radiation pattern generated by the antenna array. As described below, the method, apparatus and computer program product of an example embodiment are configured to disable one or more antenna elements of the antenna array based upon the distance of the antenna elements from a predefined location in relation to the antenna array, such as the center of the antenna array. As a result, the method, apparatus and computer program product of an example embodiment selectively utilize a plurality of antenna element of the antenna array such that the active portion of the antenna array approximates a circular array even though the antenna array of an example embodiment has a rectangular shape. However, the active portion of the antenna array may be differently shaped in other embodiments and may have, for example, a hexagonal shape, an octagonal shape, a circular shape, an elliptical shape or the like. By disabling certain antenna elements of the antenna array based upon the distance of the antenna elements from the predefined location in relation to the antenna array, such as the center of the antenna array, power dissipation is reduced for even mmWave devices that include antenna arrays, such as those utilized in conjunction with a 5th Generation (5G) wireless network.

As shown in FIG. 1, an apparatus 10 is provided in accordance with an example embodiment for selectively utilizing a plurality of antenna elements of an antenna array 12. The apparatus of this example embodiment includes, is associated with or is otherwise in communication with processing circuity 14 and a memory 16, which may be integrated with the antenna array or may be separate from but in communication with the antenna array. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various devices including various network devices, such as an access point, a base station, e.g., a Node B (NB) including an eNB in a Long Term Evolution (LTE) system or a gNB in 5G new radio (NR), a macro base station, a pico base station, a femto base station or the like, or another infrastructure component with an antenna array including other wireless transmitting and/or receiving nodes or points, a controller apparatus associated with such network devices and embodied, for example, by the network devices or by a separate controller such as a radio network controller and/or various user equipment or client devices, such as satellite earth terminals, point-to-point systems, a portable device, e.g., a smartphone, a mobile phone, a laptop computer, a tablet computer, a navigation device, a music/media device, etc. Additionally, the apparatus may be embodied by any of a variety of handheld devices, wearable devices, such as devices integrated into clothing accessories that can be worn by a user, portable devices, such as devices mounted on vehicles or the like. However, in some embodiments, the apparatus may be embodied as a chip or chip set. In other words, the apparatus may comprise one or more physical packages (e.g., chips) including materials, components and/ or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein. In an example embodiment, the chip or chipset may comprise or be a part of a module or may be split between sub-modules of an electronic device.

The processing circuitry 14 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 14 may be configured to execute instructions stored in the memory device 16 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The antenna array 12 includes a plurality of antenna elements. Although the antenna array may have a variety of configurations, the antenna array of an example embodiment is a rectangular antenna array having a plurality of rows of antenna elements and a plurality of columns of antenna elements. The antenna array may include any of a variety of different types of antenna elements including, but not limited to, for example, a patch antenna, a dipole, a suspended antenna element, a slot, a waveguide aperture or a multiplicity of these elemental radiators. The antenna array also includes electronic circuitry for controlling and/or otherwise interacting with the antenna elements. In an example embodiment, the electronic circuitry includes a plurality of amplifiers, at least one of which is associated with each respective antenna element of the antenna array. Although the antenna array may include a one-to-one correspondence between the amplifiers and the antenna elements with each amplifier associated with a respective antenna element, and with each antenna element associated with a respective amplifier, one or more amplifiers may be associated with one or more antenna elements in other configurations. For example, a single amplifier may be associated with two or more antenna elements. Alternatively, two or more amplifiers may be associated with the same antenna element.

In an embodiment in which the antenna array 12 operates in a transmission mode with the plurality of antenna elements being selectively fed, the plurality of amplifiers may include a plurality of power amplifiers, at least one of which is associated with and is utilized to feed each respective antenna element of the antenna array. In some embodiments, such as in conjunction with an antenna array configured to operate with a mmWave frequency, an active antenna array may be utilized in order to provide sufficiently high radiated power levels. In this regard, a plurality of power amplifiers may be associated with each of the plurality of antenna elements. In this example embodiment, the individual radiated fields generated by the antenna element based upon signals fed by a respective power amplifier may be phased so that the individual radiated fields add constructively at the target, such as at or proximate the location of a user device that is the target of the transmitted signals. In an alternative embodiment in which the antenna array operates in a reception mode with the signals that are received by a selected plurality of antenna elements being processed, the plurality of amplifiers may include a plurality of low noise amplifiers, at least one of which is associated with and is utilized to process signals from each respective antenna element of the antenna array. In an example embodiment, the radiated field from a distant transmitter at a particular location gives rise to signals received at the location of each antenna element which are added constructively by the combination of the low noise amplifier outputs. Although described as alternately operating in a transmission mode or a reception mode, the antenna array of an example embodiment may be configured to operate in both a transmission mode and a reception mode.

During operation at mmWave frequencies, the efficiencies of the power amplifiers of the antenna array operating in the transmission mode are relatively small, such as on the order of the few percent, such that reducing the output power of the power amplifiers, but continuing to operate all of the power amplifiers has limited effect upon the power consumption and corresponding thermal dissipation requirements of the antenna array 12 and, in particular, the amplifiers associated with the antenna elements. Likewise, the efficiencies of the low noise amplifiers of the antenna array operating in the reception mode are essentially constant and independent of the signal level such that reducing the output power of the low noise amplifiers, but continuing to operate all of the low noise amplifiers has limited effect upon the power consumption and corresponding thermal dissipation requirements of the amplifiers of the antenna array. However, deactivating the electronic circuitry, such as the amplifier(s), associated with one or more of the antenna elements so as to correspondingly disable and render inactive the one or more of the antenna elements of the antenna array, does reduce the power consumption and corresponding thermal dissipation requirements of the electronic circuitry, e.g., the amplifiers, of the antenna array in a more appreciable manner. However, the antenna elements of the antenna array that continue to be utilized and correspondingly the antenna elements of the antenna array that are disabled are selectively identified in accordance with an example embodiment such that the resulting array pattern remains acceptable and is not significantly adversely impacted. Absent such selective utilization of the antenna elements of the antenna array and the judicious disablement of one or more antenna elements of the antenna array as provided in accordance with an example embodiment, the power consumption of the antenna array could be reduced, but the resulting radiation pattern may no longer be adequate.

An apparatus 10 of an example embodiment therefor includes means, such as the processing circuitry 14 or the like, for selectively utilizing a plurality of antenna elements of the antenna array 12. In an example embodiment and as described in more detail below, the plurality of antenna elements of the antenna array that are selectively utilized result in an active portion of the antenna array that approximates a circular array. In this regard, the approximation of a circular array is provided in instances in which the active portion of the antenna array (that is, the portion of the antenna array that continues to be utilized) has a circular shape or at least a shape that is closer or more circular than the shape of the overall antenna array, such as in an instance in which all of the antenna elements of the antenna array are fed. By disabling antenna elements such that the active portion of the antenna array has a circular shape, the power and gain provided by the active portion of the antenna array may be reduced, but the impact to the sidelobe level is minimized, thereby facilitating control of interference to and/or from the antenna array.

In relation to the selective utilization of the plurality of antenna elements of the antenna array 12, the antenna array of an example embodiment may be operated in a transmission mode with the plurality of antenna elements being selectively fed or driven. In this example embodiment, certain antenna elements may be disabled, such as by deactivating the electronic circuitry, e.g., the power amplifiers, associated therewith, such that only the plurality of antenna elements that are selectively fed remain enabled. In other embodiments, however, the antenna array may be operated in a reception mode with the selective utilization of the plurality of antenna elements being provided by the selective processing of the signals received by only the plurality of antenna elements. In this example embodiment, certain antenna elements may be disabled, such as by deactivating the electronic circuitry, e.g., the low noise amplifiers, associated therewith, such that signals received by only the plurality of antenna elements are processed.

As shown in block 20 of FIG. 2 in relation to the selective utilization of the plurality of the antenna elements, the apparatus 10 of this example embodiment includes means, such as the processing circuitry 14 or the like, for identifying one or more antenna elements of the antenna array 12 based upon a distance of the one or more antenna elements from a predefined location in relation to the antenna array. Although the predefined location may be defined in various manners, the predefined location of the antenna array is the center of the antenna array in one example embodiment. In this embodiment, the distance, such as the Euclidean distance, of each of the antenna elements of the antenna array from the predefined location, e.g., the center, of the antenna array may be determined and one or more antenna elements of the antenna array that are located at the greatest distance from the predefined location, e.g. the center, of the antenna array may be identified.

As shown in block 22 of FIG. 2, the apparatus 10 of this example embodiment also includes means, such as the processing circuitry 14 or the like, for disabling the one or more antenna elements of the antenna array 12 that have been identified such that the one or more antenna elements that are disabled are not utilized and do not comprise the active portion of the antenna array. Thus, in the example embodiment noted above in which the antenna elements that are furthest from the center of the antenna array are identified, these same antenna elements that are furthest from the center of the antenna array are disabled. As a result of the disablement of the one or more antenna elements that have been identified, such as the one or more antenna elements that are furthest from the center of the antenna array, the one or more antenna elements that are disabled are not utilized, such as by not being fed during operation of the antenna array in the transmission mode or by receiving signals that are not processed during operation of the antenna array in the reception mode. In order to disable the one or more antenna elements, the electronic circuitry, such as the amplifiers, associated with the one or more antenna elements that have been identified may be deactivated by the processing circuitry. Additionally or alternatively, the electronic circuitry, such as the amplifier(s), associated with the one or more antenna elements that have been identified to be deactivated may be switchably disconnected, such as by the processing circuitry, from the signal source. The electronic circuitry, such as the amplifier(s), associated with the one or more antenna elements that have been identified to be deactivated may be disabled by, for example, switching off or removing the power supply, utilizing an intrinsic enable capability (e.g., hardware signal and/or control message) or manipulating the bias voltages to cause certain active elements to essentially shut off.

As shown in block 24 of FIG. 2, the apparatus 10 of this example embodiment further includes means, such as the processing circuitry 14 or the like, for causing a plurality of antenna elements of the antenna array 12 that have not been disabled to be utilized, such as by being fed or driven during operation of the antenna array in the transmission mode or by receiving signals that are processed during operation of the antenna array in the reception mode. These antenna elements of the antenna array that are utilized comprise the active portion of the antenna array and, in an example embodiment, approximate a circular array as a result of the disablement of one or more antenna elements that have been identified based upon the distance of the one or more antenna elements from the predefined location relative to the antenna array, such as the center of the antenna array. In this regard, the apparatus, such as the processing circuitry, may be configured to cause a plurality of antenna elements that have not been disabled to be selectively utilized by maintaining a switchable connection between the antenna elements and/or the amplifiers associated with the antenna elements and the signal source and/or by maintaining the amplifiers associated with the antenna elements that are to be selectively utilized in an active state.

As noted above, the apparatus 10, such as the processing circuitry 14, of an example embodiment is configured to disable one or more antenna elements by disabling the one or more antenna elements that are furthest from the center of the antenna array. For example, in an embodiment in which the antenna array comprises a rectangular antenna array, the apparatus, such as the processing circuitry, is configured to disable one or more antenna elements that are furthest from the center of the antenna array by disabling the one or more antenna elements in one or more corners of the rectangular antenna array, such as in each of the four corners of the rectangular antenna array. As a result, the active portion of the antenna array following disablement of one or more antenna elements in one or more corners of the rectangular array approximates a circular array.

By disabling one or more antenna elements of the antenna array 12, various advantages may be obtained, thereby permitting a predefined objective to be achieved. For example, the power consumption and correspondingly the thermal dissipation requirements of the electronic circuitry, such as the amplifiers, of the antenna array are reduced by disabling one or more antenna elements of the antenna array, thereby correspondingly reducing the power density experienced by a device incorporating the antenna array. Consequently, the thermal management requirements of the electronic circuitry, such as the amplifiers, of the antenna array and the device incorporating the antenna array are reduced, thereby facilitating a reduction in the size of the device in some embodiments. Other predefined objectives that may be pursued by disabling one or more antenna elements of the antenna array in addition to or instead of the reduction in the power consumed by the antenna array are a reduction in gain of the antenna array or a widening of an antenna radiation pattern provided by the antenna array. Regardless of the predefined objective that is achieved, however, by selectively utilizing some antenna elements of the antenna array and disabling other antenna elements based upon the distance of the antenna elements from a predefined location relative to the antenna array, such as the center of the antenna array, the integrity of the resulting array pattern is maintained, such as an instance in which the active portion of the antenna array approximates a circular array.

By way of example of the power consumption of an antenna array 12, reference is now made to FIG. 3. FIG. 3 depicts the direct current (DC) power consumption of a rectangular antenna array having 256 antenna elements arranged in a 16×16 pattern and operating at 39 GHz, that is, at a mmWave frequency. As shown in FIG. 3, the DC power in watts of the antenna array is plotted with respect to the effective isotropic radiated power (EIRP) relative to full power in decibels (dB). In an instance in which all antenna elements of the antenna array are fed, but some of the antenna elements are driven at a lower level (such as done at cmWave frequencies to reduce the power consumption), the DC power consumption is reduced only slightly as the EIRP is reduced relative to full power as shown with line 30. However, this reduction is relatively slight, such as from 100% at full EIPR to approximately 85% in an instance in which the EIRP is reduced by 10 dB relative to full power.

In contrast, the selective feeding of a plurality of antenna elements of the antenna array 12 by disabling one or more antenna elements of the antenna array provides more substantial savings in terms of the power consumption of the antenna array, such as the electronic circuitry, as shown by line 32 of FIG. 3. In this regard, in an embodiment in which some of the antenna elements of the antenna array are disabled, while the remainder of the antenna elements of the antenna array continue to be driven at the maximum drive level, the power consumption of the antenna array, such as the electronic circuitry, reduces much more appreciably, such as from approximately 100% at full EIRP to approximately 35% in an instance in which the EIRP is reduced by 10 dB relative to full power. Thus, for an antenna array operating at mmWave frequencies, the selective disablement of one or more antenna elements of the antenna array has a much more marked influence upon a reduction in the power consumption of the antenna array relative to amplitude tapering in which all of the antenna elements of the antenna array are driven with at least some of the antenna elements being driven at a lower level.

The apparatus 10, such as the processing circuitry 14, may be configured to determine the distance of the antenna elements of the antenna array 12 from the predefined location relative to the antenna array, such as the center of the antenna array, in real time or near real time or otherwise upon having been provided the operational parameters of the device that includes the antenna array, such as the power density that the device can accommodate and/or the requirements for the array pattern that is to be generated. In some embodiments, however, a list of antenna elements of the antenna array may be generated in advance, such as by the processing circuitry, and stored, such as by the memory 16. The list of antenna elements of the antenna array not only identifies each antenna element, such as based upon the row and column position of a respective antenna element, but also includes information regarding the distance to each of the antenna elements of the antenna array from the predefined location relative to the antenna array, such as the center of the antenna array. Although the list may include the actual distance from each antenna element to the predefined location, such as the center of the antenna array, the list of an example embodiment provides information regarding the relative distance of each antenna element from the predefined location, such as the center of the antenna array, by sorting the antenna elements within the list based upon the relative distance from the predefined location, such as the center of the antenna array. Thus, the list of antenna elements may be organized in terms of decreasing distance from the predefined location, such as the center of the antenna array, such that the antenna element that is furthest from the predefined location, such as the center of the antenna array, is listed first and the antenna elements that is located closest to the predefined location, such as the center of the antenna array, is listed last. Conversely, the list of antenna elements may be organized in terms of increasing distance from the predefined location, such as the center of the antenna array, such that the antenna element that is closest to the predefined location, such as the center of the antenna array, is listed first and the antenna elements that is located furthest from the predefined location, such as the center of the antenna array, is listed last.

In an example embodiment, the apparatus 10 includes means, such as the processing circuitry 14 or the like, for determining the number of antenna elements to be disabled. The apparatus, such as the processing circuitry, may be configured to determine the number of antenna elements to be disabled in various manners. In one embodiment in which the predefined objective is the reduction in power consumed by the antenna array 12, for example, the apparatus, such as the processing circuitry, is configured to determine the difference between the power to be dissipated and correspondingly, the thermal load to be managed in an instance in which all of the antenna elements of the antenna array are utilized and the maximum thermal load that a device that includes the antenna array can accommodate. In an instance in which the thermal load generated by the antenna array in which all of the antenna elements are utilized is greater than the maximum thermal load that the device that includes the antenna array can accommodate, the apparatus of this example embodiment, such as the processing circuitry, is configured to determine, based upon the contribution to the overall thermal load provided by each antenna element, the number of antenna elements to be disabled such that the resulting thermal load of the antenna array following disablement of one or more antenna elements is no more than the maximum thermal load that may be accommodated by the device that includes the antenna array.

In some embodiments, the apparatus 10, such as the processing circuitry 14, may express the number of antenna elements to be disabled in terms of the actual number of antenna elements. In other embodiments, the number of antenna elements to be disabled may be expressed in terms of the activation level R of the antenna array 12. In an example embodiment, the activation level R of an antenna array may range from 0 in which all of the antenna elements of the antenna array are disabled to 1 in which all of the antenna elements of the antenna array are utilized and none of the antenna elements are disabled. By expressing the number of antenna elements to be disabled in terms of an activation level R, the activation level may be more readily utilized in conjunction with antenna arrays of various sizes with the number of antenna elements to be disabled being proportional to the size of the antenna array in some embodiments.

By way of example and assuming an active array, the available power to radiate by an antenna array 12 operating at an activation level R is reduced by a factor of $(1-R/(M*N))$ in which M and N represent the number of rows and columns, respectively, of the antenna array. As a result of the deactivation of certain antenna elements, there are fewer antenna elements to contribute to the far field by this same factor. Thus, the net radiated far field power is reduced by a factor of $(1-R/(M \cdot N))^2$. As indicated, the activation level R can therefore be selected to achieve a desired power reduction.

In an example embodiment that utilizes an activation level R, FIG. 4 depicts the technique for deactivating one or more antenna elements. As shown in block 40 of FIG. 4, the apparatus 10 include means, such as the processing circuitry 14 or the like, for determining the number of antenna elements to be deactivated for a desired activation level R. Although the apparatus, such as the processing circuitry, may determine the number of antenna elements to be deactivated in various manners, the apparatus, such as the processing circuitry, of an example embodiment determines the number of antenna elements to deactivate as follows:

$$\text{elements\_to\_deactivate} = \text{floor}[(1 - R) * M\_\text{rows} * N\_\text{columns}]$$

wherein M_rows and N_columns represent the number of rows and columns, respectively, of the antenna array. A count of the number of elements to deactivate may be maintained by a counter, such as may be embodied by the processing circuitry and/or the memory 16, as shown in block 42.

In an instance in which the number of elements to deactivate is greater than 0 as shown in block 44, the apparatus 10 includes means, such as the processing circuitry 14 or the like, for identifying the antenna element, such as from the list of antenna elements, that is furthest from the predefined location relative to the antenna array 12, such as the center of the antenna array. The apparatus of this example embodiment also includes means, such as processing circuitry or the like, for deactivating the antenna element that has been identified, such as from the list of antenna elements, that is located the furthest from the predefined location, such as the center of the antenna array, by deactivating the electronic circuitry, such as the amplifier(s) associated with the antenna element that has been identified. See block 46. As shown in blocks 48 and 49 of FIG. 4, the apparatus also includes means, such as the processing circuitry or the like, for reducing the count maintained by the counter of the number of antenna elements to deactivate by 1 and then determining whether the reduced count of the number of antenna elements that remain to be deactivated is greater than 0. In an instance in which the remaining number of antenna elements to be deactivated is greater than 0, the apparatus, such as the processing circuitry, repeats the foregoing process in order to identify the antenna element, such as from the list of antenna elements, that has not already been deactivated and that is furthest from the predefined location, such as the center of the antenna array, and then subsequently deactivates this antenna element. This process continues until the number of antenna elements that were initially identified to be deactivated in order to achieve the desired activation level R have been identified and deactivated. Once the remaining number of antenna elements to be deactivated is no longer greater than 0, the process concludes. As a result, the operation of the resulting antenna array with the antenna elements that have been identified based upon their distance from the predefined location, such as the center of the antenna array, being deactivated provides for an array pattern for which the integrity is maintained, but which achieves the predefined objective, such as by generating a thermal load that can be managed by the device that includes the antenna array.

As noted above, information regarding the distance, such as the relative distance, of the antenna elements from the center of the antenna array 12 may be provided by a list of antenna elements, such as a list of antenna elements organized based upon increasing or decreasing distance from the predefined location, e.g., the center of the antenna array. The list of antenna elements may be generated in various manners. However, FIG. 5 depicts the operations performed to generate the list of antenna elements in accordance to an example embodiment. As shown in block 50 of FIG. 5, the apparatus 10 of an example embodiment includes means, such as the processing circuitry 14, the memory 16 or the like, for initially creating an empty list. For an antenna array having M_rows and N_columns, the apparatus includes means, such as the processing circuitry or the like, for then determining the distance of each antenna elements from the predefined location relative to the antenna array, such as from the center of the antenna array. In this regard, for an antenna element located at row i wherein i=[1, . . . (M_rows)] and column j wherein j=[1, . . . (N_columns)]. the apparatus includes means, such as the processing circuitry or the like, for determining the distance from the antenna element located at row i and column j to the predefined location relative to the antenna array, such as the center of the antenna array at which the antenna element in row 0 and column 0 is located. See blocks 52, 54 and 56 of FIG. 5. Although the apparatus, such as the processing circuitry, of an example embodiment may determine the distance and then store the distance itself in the list in conjunction with an identification of the respective antenna element, the apparatus, such as processing circuitry, of an example embodiment determines a representation of the distance, such as the square of the distance. In this example embodiment, the apparatus, such as the processing circuitry, may be configured to determine a representation of the distance D measured from the center of a rectangular array of antenna elements in which the first element has an index of (1, 1) as follows:

$$D^2 = [(\text{Row } i - 1) - (M + 1)/2]^2 + [(\text{Column } j - 1) - (N + 1)/2]^2$$

in which Row i represents the index for the row and Column j represents the index for the column. In other embodiments, the indices for the row and column may be replaced by the distance from the center of the array to the respective antenna element.

As shown in block 58 of FIG. 5, the apparatus 10 of this example embodiment includes means, such as the processing circuitry 14, the memory 16 or the like, for associating the resulting vector for a respective antenna element that identifies the row i and column j at which the antenna element is located and a representation of the distance to the antenna element, such as $D^2$, with the respective antenna element within the list that is being constructed. The apparatus, such as the processing circuitry, then repeats the foregoing process for each antenna element, such as each antenna element within the various columns of a respective row and then, in turn, for the antenna elements in each of the remaining rows. See blocks 60, 62, 64 and 66 of FIG. 5. Once each antenna element of the antenna array is represented by the list along with information regarding the distance to the various antenna elements, the apparatus includes means, such as the processing circuitry, the memory or the like, for sorting the elements of the list based upon the distance between the respective antenna elements and the predefined location, such as the center of the antenna array. For example, the antenna elements in the list may be sorted such that the distance from each antenna elements to the predefined location, such as the center of the antenna array, is arranged in descending order, such as based upon the $D^2$ value associated with the antenna elements. See block 68 of FIG. 5. Thus, the antenna element that is the furthest from the predefined location, such as the center of the antenna array, is listed first in the resulting list and the antenna element that is located closest to the predefined location, such as the center of the antenna array, is listed last in the list of this example embodiment. As a result, the apparatus, such as the processing circuitry, may subsequently reference the list of antenna elements to identify the antenna elements that are furthest from the predefined location, such as the center of the antenna array, and which should therefore be initially considered for deactivation.

In an example embodiment in which the antenna array 14 is a rectangular antenna array, the deactivation of antenna elements based upon the distance between the antenna elements and the center of the antenna array generally results in antenna elements at or proximate the corners of the antenna array, such as all four corners of the antenna array, being deactivated such that the active portion of the antenna array has a circular shape. In this regard, FIG. 6 depicts a rectangular antenna array having 16×16 antenna elements. As shown from the left to the right in FIG. 6 in which the activation level R is progressively reduced so as to be 1.0, 0.9, 0.8, 0.7, 0.6, 0.5 and 0.3 from left to right with a corresponding reduction in power level of 0.0 dB, −0.92 dB, −1.94 dB, −3.10 dB, −4.44 dB, −6.02 dB and −10.46 dB, the active portion of the antenna array identified by the darker dots (each of which represents a respective antenna element that is driven or fed) initially assumes a circular shape with further reductions in the activation level causing the radius of the circular active portion to be reduced, thereby further reducing the thermal load generated by operation of the antenna array. FIGS. 7 and 8 provide similar examples with FIG. 7 depicting a rectangular antenna array having 8×8 antenna elements and FIG. 8 representing a rectangular antenna array having 4×16 antenna elements. In both FIGS. 7 and 8, the activation level R is reduced from 1.0 to 0.3 which results in an active portion that initially approximates a circular array and is then reduced in radius as the activation level R is further reduced. As shown in conjunction with FIG. 8, the approximation of a circular array is a somewhat elliptical array which constitutes a circular shape as the resulting elliptical array is more circular than the 4×16 rectangular antenna array.

In the example embodiment, the apparatus 10, includes means, such as the processing circuitry 14 or the like, for feeding the plurality of the antenna elements such that the plurality of antenna elements that are not disabled operate at a maximum power level. In other embodiments, however, at least some of the antenna elements that are not disabled may be operated at a reduced power level, thereby resulting in amplitude tapering. FIGS. 9a-9c depict the azimuth radiation pattern of an antenna array at different activation levels R while being subjected to amplitude tapering. For example, FIG. 9a depicts the azimuth radiation pattern of an antenna array having an activation level R of 88.1% with a solid line relative to the azimuth radiation pattern of the same antenna array with an activation level R of 100% with a dashed line. As shown, the beam width of the main lobe increases from 6.9° with an activation level R of 100% to 7.5° with an activation level R of 88.1%. Additionally, the energy carried by the side lobes decreases from −20 dB at an activation level R of 100% to −24 dB at an activation level R of 88.1%. FIGS. 9b and 9c similarly compare activation levels R of 76.6% and 50.0%, respectively, as represented by solid lines to an activation level R of 100% as represented by a dashed line. As shown, the beam width of the main lobe continues to increase to 8.0° at an activation level R of 76.6% and to 9.9° at an activation level R of 50.0%. Additionally, the power contained by the side lobes initially continues to decrease to −27 dB at an activation level R of 76.6% prior to beginning to increase and return to the original power level of the side lobes at an activation level R of 100% by returning to −20 dB at an activation level R of 50.0%.

In addition to or as an alternative to amplitude tapering as shown in FIGS. 9a-9c, the antenna elements that are not deactivated may be fed in another example embodiment by utilizing a phase tapering technique which generally serves to broaden the beam width with less impact to the EIRP as shown in FIGS. 10a-10c in comparison to amplitude tapering. As shown in FIG. 10a in which each of the antenna elements that are active are fed have the same amplitude, but in which a phase tapering technique is employed such that the signals provided to some antenna elements have a different phase than the signals provided to other antenna elements, the elevation radiation pattern of an antenna array 12 having an activation level R of 100% has a main lobe with a beam width of 18° and, for an activation level R of 88.1%, has a main lobe with a beam width of 17°. By way of comparison, the beam width of the main lobe with an activation level R of 100% would be approximately 4.6° without phase tapering. FIGS. 10b and 10c similarly compare activation levels R of 76.6% and 50.0%, respectively, as represented by solid lines to an activation level R of 100% as represented by a dashed line. As shown, with the beam width of the main lobe continues to decrease to 15° at an activation level R of 76.6% and to 9° at an activation level R of 50.0%. As FIGS. 10a-10c illustrate, as antenna elements are deactivated (as the activation level becomes lower), the broadening effect is lost and the resulting radiation pattern becomes narrower. However, the sidelobes generated once some antenna elements have been deactivated are no worse than and generally are better than the sidelobes generated when all antenna elements are driven, e.g., for an activation level R of 100%, by generally carrying less energy in the sidelobes as the activation level R decreases from 100%.

As described above, the method, apparatus 10 and computer program product of an example embodiment provide for one or more antenna elements of an antenna array 12 to be disabled, such as by deactivating the electronic circuitry, such as the amplifier(s) associated with the one or more antenna elements, while selectively utilizing the remainder of the antenna elements of the antenna array. As a result, the power consumption and, consequently, the thermal load to be managed by a device that incorporates the antenna array may be reduced without appreciably impairing the integrity of the resulting array radiation pattern. Thus, the power density that a device that includes the antenna array must accommodate may be reduced, thereby improving the cooling efficiency and potentially allowing the device to be correspondingly reduced in size. The reduction in the thermal load to be managed may also permit the device that incorporates the antenna radiation pattern to have improved reliability and, in some embodiments to have an extended battery run time. In some embodiments, the reduction in thermal load to be managed by a device may be sufficient to allow the thermal load to be dissipated utilizing only convection cooling, thereby eliminating the need for a fan or other active device to cool the device. Similarly, the method, apparatus and computer program product of an example embodiment may be utilized to extend the operating temperature range of a device incorporating the antenna array by reducing the array aperture only if a certain internal temperature is exceeded and then, only reducing the array aperture enough to maintain the internal temperature at the maximum allowed temperature.

As described above, the method, apparatus 10 and computer program product may be useful in conjunction with an antenna array 12 configured to operate at millimeter wave frequencies or at even greater frequencies. As such, the method, apparatus and computer program product are useful in conjunction with 5G devices. However, the method, apparatus and computer program product may be utilized in conjunction with an antenna array configured to communicate at other frequencies. For example, the method, apparatus and computer program product of an example embodiment may provide for the energy demand of an antenna array to be reduced, which is useful in a variety of applications including applications in which the power amplifiers exhibit significant power dissipation in the quiescent mode, such as in conjunction with power amplifiers in applications that require a high degree of linearity in relation to the power amplifiers regardless of the frequency of operation, and applications that consume substantial power and generate significant heat such as multiple-input multiple-output (MIMO) applications and other RF system which are, not necessarily cellular based but which use high power transmitters.

The method, apparatus 10 and computer program product of an example embodiment may be advantageous in an instance in which the heat sink, such as the heat sink of a device that incorporates the antenna array 12, has a relatively low thermal impedance, such as an instance in which the heat sink consists of a metal mass having a substantially high conductivity or contains heat pipes or the like to distribute the thermal load. By lowering the power density in accordance with the method, apparatus and computer program product of an example embodiment, the cooling efficiency may be improved and the temperature of any neighboring active devices may correspondingly be reduced.

In addition to reducing the power consumption and, consequently, the thermal load to be managed by a device that incorporates the antenna array 12, the selective deactivation of one or more antenna elements of an antenna array may permit other predefined objectives to be achieved. For example, one or more antenna elements of an antenna array may be selectively deactivated in order to reduce the gain provided by the antenna array. Additionally or alternatively, one or more antenna elements of an antenna array may be selectively deactivated in order to widen the antenna radiation pattern provided by the antenna array, as exemplified by FIGS. 9a-9c.

FIGS. 2, 4 and 5 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 16 of an apparatus employing an embodiment of the present invention and executed by the processing circuitry 14. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. An apparatus comprising processing circuitry and memory including computer program code, the memory and the computer program code configured to, with the processing circuitry, cause the apparatus to perform at least the following:
   determine a number of antenna elements of an antenna array to disable to achieve a predefined objective; and
   selectively utilize a plurality of antenna elements of the antenna array,
   wherein the apparatus being caused to selectively utilize the plurality of antenna elements comprises identifying the antenna elements of the antenna array to disable based upon the number of antenna elements determined to be disabled and a distance of the antenna elements from a predefined location in relation to the antenna array and disabling the antenna elements of the antenna array that have been identified such that the antenna elements that are disabled are not utilized and do not comprise an active portion of the antenna array.

2. An apparatus according to claim 1 wherein the predefined location comprises a center of the antenna array, and wherein the apparatus being caused to disable the number of antenna elements comprises disabling the number of antenna elements that are furthest from the center of the antenna array.

3. An apparatus according to claim 1 wherein the predefined objective comprises at least one of a reduction in power consumed by the antenna array, a reduction in gain of the antenna array or a widening of an antenna radiation pattern provided by the antenna array.

4. An apparatus according to claim 1 wherein the apparatus being caused to selectively utilize a plurality of antenna elements of an antenna array comprises selectively feeding the plurality of antenna elements in order to transmit signals via the active portion of the antenna array.

5. An apparatus according to claim 4 wherein the apparatus being caused to disable one or more antenna elements comprises deactivating electronic circuitry associated with the one or more antenna elements in order to correspondingly disable the one or more antenna elements.

6. An apparatus according to claim 5 wherein the apparatus being caused to deactivate electronic circuitry comprises deactivating one or more power amplifiers associated with the one or more antenna elements.

7. An apparatus according to claim 1 wherein the apparatus being caused to selectively utilize a plurality of antenna elements of an antenna array comprises selectively processing signals received by the plurality of antenna elements such that the signals received via the active portion of the antenna array are processed.

8. An apparatus according to claim 7 wherein the apparatus being caused to disable one or more antenna elements comprises deactivating electronic circuitry associated with the one or more antenna elements in order to correspondingly disable the one or more antenna elements.

9. An apparatus according to claim 8 wherein the apparatus being caused to deactivate electronic circuitry comprises deactivating one or more low noise amplifiers associated with the one or more antenna elements.

10. An apparatus according to claim 1 wherein the apparatus being caused to identify the number of antenna elements of the antenna array based upon the distance of the number of antenna elements from the predefined location in relation to the antenna array comprises referencing a list of antenna elements of the antenna array that also provides information regarding at least the distance of each of the antenna elements of the antenna array from the predefined location in relation to the antenna array.

11. A method comprising:
determining a number of antenna elements of an antenna array to disable to achieve a predefined objective; and
selectively utilizing a plurality of antenna elements of an antenna array such that an active portion of the antenna array approximates a circular array,
wherein selectively utilizing the plurality of antenna elements comprises identifying the antenna elements of the antenna array to disable based upon the number of antenna elements determined to be disabled and a distance of the antenna elements from a predefined location in relation to the antenna array and disabling the antenna elements of the antenna array that have been identified such that the antenna elements that are disabled are not utilized and do not comprise an active portion of the antenna array.

12. A method according to claim 11 wherein the predefined location comprises a center of the antenna array, and wherein disabling the one or more antenna elements comprises disabling the one or more antenna elements that are furthest from the center of the antenna array.

13. A method according to claim 11 wherein the predefined objective comprises at least one of a reduction in power consumed by the antenna array, a reduction in gain of the antenna array or a widening of an antenna radiation pattern provided by the antenna array.

14. A method according to claim 11 wherein selectively utilizing the plurality of antenna elements of the antenna array comprises selectively feeding the plurality of antenna elements in order to transmit signals via the active portion of the antenna array.

15. A method according to claim 11 wherein selectively utilizing the plurality of antenna elements of the antenna array comprises selectively processing signals received by the plurality of antenna elements such that the signals received via the active portion of the antenna array are processed.

16. An apparatus comprising processing circuitry and memory including computer program code, the memory and the computer program code configured to, with the processing circuitry, cause the apparatus to perform at least the following:
selectively utilize a plurality of antenna elements of an antenna array such that an active portion of the antenna array approximates a circular array,
wherein the apparatus being caused to selectively utilize the plurality of antenna elements comprises identifying one or more antenna elements of the antenna array based upon a distance of the one or more antenna elements from a predefined location in relation to the antenna array and disabling the one or more antenna elements of the antenna array that have been identified such that the one or more antenna elements that are disabled are not utilized and do not comprise the active portion of the antenna array.

17. An apparatus according to claim 16 wherein the predefined location comprises a center of the antenna array, and wherein the apparatus being caused to disable the one or more antenna elements comprises disabling the one or more antenna elements that are furthest from the center of the antenna array.

18. An apparatus according to claim 16 wherein the apparatus being caused to disable the one or more antenna elements comprises determining a number of antenna elements to disable to achieve a predefined objective.

19. An apparatus according to claim 16 wherein the apparatus being caused to selectively utilize a plurality of antenna elements of an antenna array comprises selectively feeding the plurality of antenna elements in order to transmit signals via the active portion of the antenna array.

20. An apparatus according to claim 19 wherein the apparatus being caused to selectively feed the plurality of antenna elements of the antenna array comprises selectively feeding the plurality of antenna elements such that the plurality of antenna elements that are fed operate at a maximum power level.

* * * * *